April 26, 1960 R. R. HOLLIEN 2,934,113
ROUTER BIT AND DRIVE SHAFT ASSEMBLY WITH PILOT
Filed Jan. 7, 1958
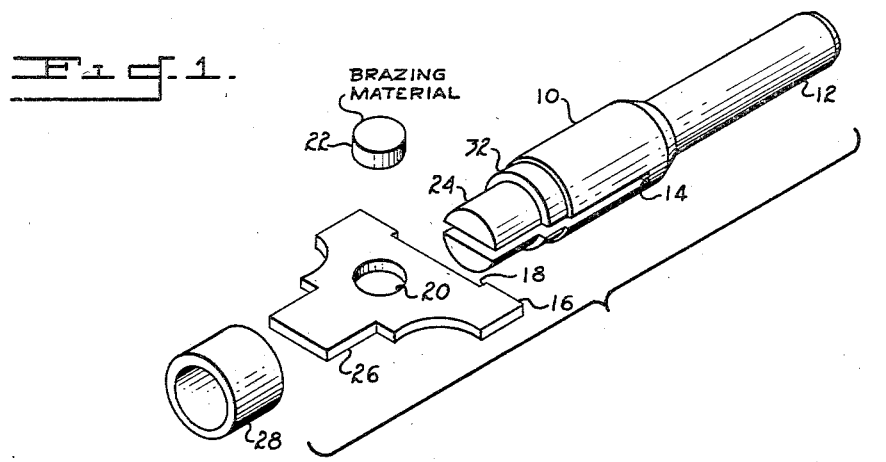
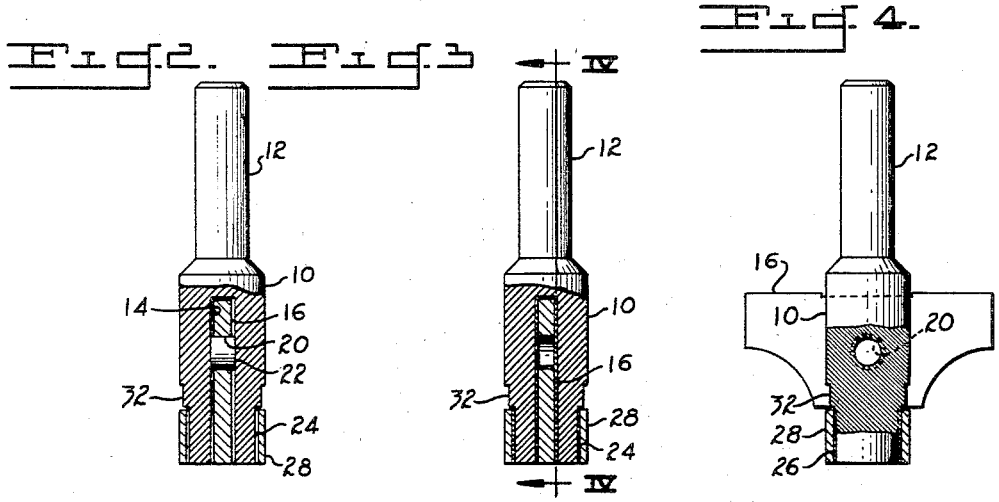
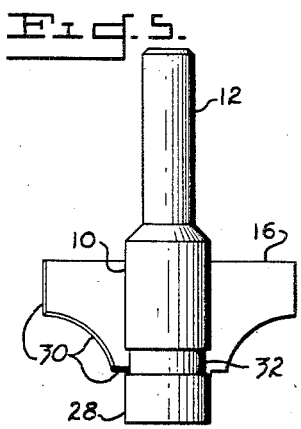
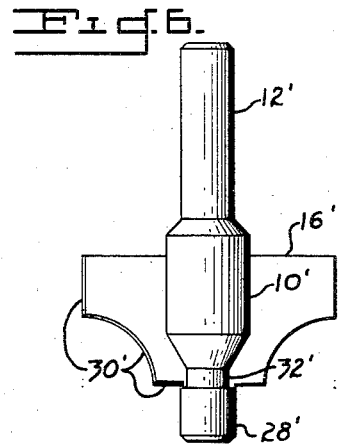
INVENTOR.
Richard R. Hollien
BY Chapin & Neal
ATTORNEYS

2,934,113
ROUTER BIT AND DRIVE SHAFT ASSEMBLY WITH PILOT

Richard R. Hollien, Shelburne Falls, Mass., assignor to Millers Falls Company, Greenfield, Mass., a corporation of Massachusetts Application January 7, 1958, Serial No. 707,542

6 Claims. (Cl. 144—241)

The present invention relates to router bits.

The primary object of the invention is to reduce the cost of manufacture of router bits having cutting edges formed of high speed steel and is more particularly directed to the reduction of costs in the manufacture of such bits as are provided with a pilot at the free end thereof.

Among the novel features of the invention is a router bit construction comprising a brazed assembly of parts wherein the cutting portions are formed of high speed steel and the remaining parts are formed of carbon steels in a manner which enables substantial cost reductions over the conventional manner of forming router bits from a unitary piece of high speed steel.

The above and other related objects and features of the invention will be apparent from a reading of the following description of the disclosure found in the accompanying drawing and the particular novelty thereof pointed out in the appended claims.

The closest prior art known to me may be found in Huxtable Patent No. 2,794,468 granted June 4, 1957 to the assignee of the present case.

In the drawing:

Fig. 1 is an exploded view of the various components used in the manufacture of the present router bit;

Fig. 2 is a view partially in section showing the components of Fig. 1 in their assembled relation;

Fig. 3 is a view illustrating the manner in which brazing material has flowed during the brazing operation;

Fig. 4 is a section taken substantially on line IV—IV of Fig. 3;

Fig. 5 is a side elevation of the finished router bit after the cutting edges thereof have been sharpened; and Fig. 6 is a side elevation of another finished router bit embodying the present invention.

Referring first to Fig. 1, there will be seen a shank 10 which is preferably formed of a low or medium carbon steel having maximum toughness. The upper end of the shank 10 may be formed with a reduced diameter 12, which is to be received in the chuck or collet of a power router in conventional fashion. The shank 10 is centrally slotted as at 14 to receive a cutting blade 16. The blade 16, as seen particularly in Figs. 1 and 4 is unsharpened, the cutting edges being sharpened after assembly as will further appear. The width of the slot 14 approximates the thickness of the blade 16, so that when assembled there is a snug fit between the matching surfaces thereof. The upper end of the blade 16 is recessed a short distance, as at 18, with the width of the recess 18 approximating the diameter of the shank 10 at the upper end of the slot 14. When assembled, the sides of the recess 18 position the upper end of the blade 16 centrally of the shank 10 in a transverse sense with respect to the slot 14.

The blade 16 is apertured at 20 to receive a slug of brazing material 22. Preferably the diameter of the slug 22 is somewhat greater than the diameter of the aperture 20, so that the slug 22 may be press fitted therein. Also, the slug 22 is somewhat thicker than the thickness of blade 16, for reasons which further appear.

The lower end of the shank 10 is formed with a reduced diameter 24, and the lower end of the blade 16 is formed with a symmetrically located tail portion 26, which is of a width approximating the length of the slot 14 at the diameter 24. A pilot forming sleeve 28 is provided with an inner diameter of a dimension to snugly receive the reduced diameter 24 of the shank 10. Preferably the diameter of the shank adjacent the upper end of the sleeve 28 is reduced to a dimension, as at 32, somewhat less than the diameter of said sleeve for reasons which further appear. While the diameter 32 is shown as considerably less than that of the sleeve 28, it is to be understood that this is only for illustrative purposes and that in fact the preferable difference in diameters is in the order of $\frac{1}{64}$ inch.

The above described parts are assembled in the following fashion. The brazing slug 22 is press fitted into the aperture 20 of the blade 16. The thickness of slug 22 being somewhat greater than the thickness of the blade 16, the slug 22 will extend a short distance beyond either side of the blade 16, as may be seen in Fig. 2. The press fit mentioned above has been found advantageous in permitting the slug 22 and the blade 16 to be freely handled as a subassembly. That is, an operator may, by using an appropriate fixture, readily insert slugs 22 into blades 16 and such subassemblies may then be inserted into the shanks 10 by other operators at any convenient time or place.

At this point, note will be taken that the clearances between the various assembled parts shown in Figs. 2, 3 and 4 are greatly exaggerated for illustrative purposes and, in fact, in all cases, it is desirable that very close fits be maintained.

It has also been found preferable that the slug 22 extend beyond either side of the blade 16 so that, in the act of assembling the blade into the position seen in Fig. 2, the slug 22 will be wiped against the inner surfaces of the slot 14. This wiping action will rub off any thin oxide layer which might be present and facilitate a good bond when the parts are ultimately brazed together.

In practice, it has been found preferable to first manually insert the blade 16 into the slot 14 as far as possible, as limited by the contact of slug 22 with the side walls of said slot. Sleeve 28 is then slipped over tail 26 and by use of an appropriate fixture, the blade 16 is further forced into said slot until the upper end of sleeve 28 abuts the shoulder defining the lower end of diameter 32.

One of the features of the invention will be appreciated from the fact that this assembly of parts requires no positioning means in order to assure central location of the blade 16. In other words, the upper end of the blade 16 is centrally located by the recess 18, while the lower end of the blade 16 is centrally located by the tail 26, as it is confined by the sleeve 28. The sleeve 28 also simplifies the brazing operation in that the assembly seen in Fig. 2 may be inverted and subjected to a brazing heat sufficient to melt the slug 22 and yet not high enough to affect the hardness characteristics of the blade 16. When so heated, the brazing material (indicated by the closely spaced hatching) will flow by capillary action along the flat sides of the blade 16 (Figs. 3 and 4) to the base of the diameter 24, and then around the diameter 24 thereby bonding or brazing the various parts in the described assembled relation.

The composite bit thus formed is seen in Fig. 5 after its cutting edges have been sharpened. The shank 10 being formed of a tough fatigue-resistant steel, serves a specialized function of resisting torsional impact loads, which are imposed as the router bit is used. The blade 16, being of high speed steel, possesses very superior strength and wear characteristics, and requires sharpening only at infrequent intervals. These desirable advantages are provided through the use of a minimum amount of high speed steel, which is relatively costly material. The blade 16 is also extremely economical to form, in that its thickness may be obtained by way of surface grinding—a relatively inexpensive operation, giving a high measure of accuracy.

The cutting edges 30 are sharpened in conventional fashion and may take many various forms. The configuration of cutting surfaces herein disclosed is commonly referred to as a beading bit, but this is of no material importance to the present invention. The sleeve 28, after the brazing operation, serves as a pilot for the present router bit to space the cutting edges 30 a fixed distance inwardly from the edge of a work piece. It has been found that the pilot 28 becomes highly polished in use, and is highly resistant to wear. It is therefore possible to form the pilot-forming sleeve 28 of a low carbon steel, in a highly economical fashion.

A somewhat modified form of bit is seen in Fig. 6, which bit is shown after brazing and grinding and comprises the same elements (denoted by primed reference characters) as the bit already described. The primary difference lies in the fact that sleeve 28' is of a diameter substantially less than the major diameter of the shank 10'. Again it is preferable that a relieved diameter 32' be formed to provide chip and grinding clearance. The shank 10' tapers upwardly from the reduced diameter 32' to preserve the strength of the construction seen in Figs. 1–5 and yet obtain the advantages of the smaller diameter pilot 28'.

It will be appreciated that the above described composite bits provide cutting edges of high speed steel in a much more economical manner than the conventional practice of hogging such bits from a solid piece of high speed steel stock, or forging high speed steel where elaborate cutting contours are desired. Furthermore, the present construction enables the provision of specialized qualities for various portions of the bit through the use of the most economical possible materials. Further, torsional impact resistance can be made greater than what is obtainable from solid high speed steel router bits. Another advantage to be recognized is the added strength given the brazed assembly by the pilot-forming sleeve 28. That is, in addition to the strength of the braze, the sleeve 28 further insures against any spreading of the slotted portion of the shank 10, as the router bit is in use.

A further factor to be recognized is that the relieved diameter 32 or 32' provides clearance for chips and thus facilitates the cutting action of the bit.

Having thus described the invention, what is novel and desired to be secured by Letters Patent of the United States is:

1. A composite router bit assembly for a brazing operation, said assembly comprising a shank circular in cross-section and having a central longitudinal slot opening at its outer end, a flat sided cutting blade having a thickness approximating the width of said slot and received therein, said blade having a shallow centrally disposed recess at its upper end, the width of said recess approximating the diameter of said shank to position the upper end of the blade centrally of said shank, said blade having a longitudinal dimension measured from said recess which approximates the depth of said slot, the outer end of said blade having a width which approximates the measurement of said slot diametrically of said shank at the outer end of the shank, and a pilot-forming sleeve embracing the outer end of said shank to confine and position the outer end of said blade centrally of said shank.

2. An assembly, as in claim 1, wherein the outer end of the shank is formed with a reduced diameter to receive said sleeve and the outer diameter of the sleeve is slightly greater than the adjacent diameter of the shank.

3. An assembly, as in claim 2, wherein the blade is provided with an opening which is closed off on either side by portions of the shank defining said slot, and a brazing slug is captured in said opening.

4. A compositely formed router bit, comprising a shank circular in cross-section and having a central longitudinal slot opening at its outer end, a flat sided cutting blade, having a thickness approximating the width of said slot, said blade having a longitudinal dimension which approximates the depth of said slot, the outer end of said blade having a width which approximates the measurement of said slot diametrically of said shank at the outer end of the shank and a pilot-forming sleeve on the outer end of said shank, said parts being integrally secured in assembled relation.

5. A router bit, as in claim 4, wherein the shank is formed with a reduced diameter at its outer end for receiving the sleeve and the shank has a relieved diameter immediately adjacent said sleeve, which diameter is slightly less than the outer diameter of the sleeve.

6. A router bit, as in claim 4, wherein the shank is formed of a tough, fatigue-resistant steel, the cutting blade is formed of a high speed steel, and the sleeve is formed of a low carbon steel.

References Cited in the file of this patent

UNITED STATES PATENTS

| | | |
|---|---|---|
| 668,494 | Crist | Feb. 19, 1901 |
| 2,130,684 | Hintermeyer | Sept. 20, 1938 |
| 2,455,538 | Wagner | Dec. 7, 1948 |
| 2,731,990 | Cerkleski | Jan. 24, 1956 |
| 2,828,787 | Boggs | Apr. 1, 1958 |